(No Model.)

H. FORSTER.
INSERTIBLE TOOTH FOR DIAMOND SAWS.

No. 474,084. Patented May 3, 1892.

WITNESSES:
Charles Schroeder
Marion Hall

INVENTOR
Henry Forster
BY
ATTORNEYS.

UNITED STATES PATENT OFFICE.

HENRY FORSTER, OF NEW YORK, N. Y.

INSERTIBLE TOOTH FOR DIAMOND SAWS.

SPECIFICATION forming part of Letters Patent No. 474,084, dated May 3, 1892.

Application filed April 3, 1891. Serial No. 387,509. (No model.)

*To all whom it may concern:*

Be it known that I, HENRY FORSTER, of New York city, county and State of New York, a citizen of the United States of America, have invented certain new and useful Improvements in Insertible Teeth for Diamond Saws, of which the following is a specification.

This invention relates to an improved insertible diamond tooth for stone-saws, by which the diamonds are held in a permanent and reliable manner in the tooth or bit without being liable to get loose, while the saw-blade is protected against too rapid wear by the hard-metal material of which the teeth or bits are formed; and the invention consists of an insertible tooth for diamond saws, which is riveted or otherwise fastened into a recess of the saw-blade and made of cast-steel or other hard metal and of greater thickness than the saw-blade, said tooth or bit being provided with soft-metal grooved edge pieces, by which the tooth is fitted to the tapered edges of the recess of the saw-blade.

Figure 1:
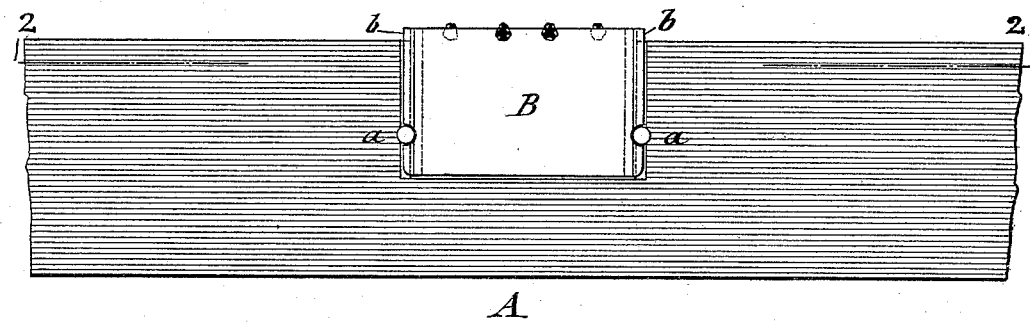
Figure 2:

In the accompanying drawings, Figure 1 represents a side elevation of a saw-blade with my improved insertible diamond tooth; and Fig. 2 is a horizontal section on line 2 2, Fig. 1.

Similar letters of reference indicate corresponding parts.

A in the drawings represents a saw-blade, and B an insertible saw tooth or bit, which is set into a recess of the blade A and fitted by means of grooved edge strips $b\ b$ to the beveled edges of the recess of the saw-blade. The tooth B is fastened by transverse rivets, keys, or other suitable fastening devices $a$ to the blade A.

The insertible saw-tooth A is made of cast-steel or other hard metal, to which a hard temper is imparted, said metal being cast in a mold around the diamonds, so as to firmly hold the same in position. The strips $b\ b$ are made of soft metal, such as brass, copper, soft iron, and the like, which are protected by the greater hardness of the tooth or bit B, which is made of greater thickness than the saw-blade and edge strips, and thereby prevented from being worn off during the sawing operation. The soft-metal edge pieces $b$ are soldered on the sides of the tooth or bit B, so as to adhere firmly thereto.

The hard metal from which the body of the tooth or bit is formed protects the saw-blade against abrasion and forms also a protection for the diamonds inserted into the same as the surface of the tooth or bit wears off slowly and evenly with the progress of the work.

Owing to the soft-metal edge pieces the saw-tooth can be inserted readily into the recess of the blade without danger of splitting or otherwise injuring the tooth while it is riveted to the same.

A saw-tooth of this construction can be produced at a less expense and exchanged quicker for a worn tooth than the diamond saw-teeth heretofore in use. It protects the saw-blade and edge pieces effectively against abrasion and produces the uniform wearing down of the body of the tooth of the cutting-diamonds.

Having thus described my invention, I claim as new and desire to secure by Letters Patent—

1. The combination, with a recessed saw-blade, of an insertible saw tooth or bit formed of cast steel or other hard material and having diamonds inserted into the same, grooved soft-metal edge pieces for said tooth, and rivets or keys by which the edge pieces and tooth are secured into the recesses of the saw-blade, said tooth being made of greater thickness than the saw-blade and edge pieces, substantially as set forth.

2. An insertible diamond saw tooth or bit formed of a body of cast steel or other hard metal, provided with diamonds inserted in the same and with grooved soft-metal edge pieces soldered to the ends of the tooth or bit, the body of the tooth being made of greater thickness than the edge pieces, substantially as set forth.

In testimony that I claim the foregoing as my invention I have signed my name in presence of two subscribing witnesses.

HENRY FORSTER.

Witnesses:
PAUL GOEPEL,
CHARLES SCHROEDER.